United States Patent

Beaudoin et al.

[11] Patent Number: 5,847,553
[45] Date of Patent: Dec. 8, 1998

[54] CURRENT BOOSTER FOR PC CARD

[75] Inventors: J. F. Denis Beaudoin, Surrey; Gregory John Funk, Delta, both of Canada

[73] Assignee: Sierra Wireless, Inc., Richmond, Canada

[21] Appl. No.: 709,583

[22] Filed: Sep. 9, 1996

[51] Int. Cl.[6] .................................................. G05F 1/40
[52] U.S. Cl. ............................................. 323/282; 363/21
[58] Field of Search ............................... 323/282; 363/21, 363/97, 101

[56] References Cited

U.S. PATENT DOCUMENTS

| | | | |
|---|---|---|---|
| 3,629,622 | 12/1971 | Denenberg | 323/284 |
| 4,680,674 | 7/1987 | Moore . | |
| 4,731,719 | 3/1988 | Nelson | 363/21 |
| 5,144,222 | 9/1992 | Herbert | 323/282 |
| 5,201,066 | 4/1993 | Kim . | |

FOREIGN PATENT DOCUMENTS

| | | |
|---|---|---|
| 0 434 231 A2 | 6/1991 | European Pat. Off. . |
| 0 599 410 A1 | 6/1994 | France . |
| 07135767 | 5/1995 | Japan . |
| WO 95/08222 | 3/1995 | WIPO . |

Primary Examiner—Stuart N. Hecker
Attorney, Agent, or Firm—Burns, Doane, Swecker & Mathis, LLP

[57] ABSTRACT

An integrated circuit card, such as PC Card, is provided in which a step-down converter in the form of a switching regulator provides a stable operating voltage at increased current beyond what is normally available from a single source. In particular, a quiet and stable power supply is obtained by modifying the standard configuration of a switching regulator such that the catch diode, or freewheeling diode, instead of being connected to ground at the non-blocking terminal, is connected to a primary voltage source approximating the desired output voltage. If the desired output voltage is 5V, for example, the catch diode may be connected to Vcc supplied by a PC Card slot, which nominally supplies 5V. The block terminal of the catch diode is connected through the switch of the switching regulator to a higher, supplementary, voltage source, e.g. Vpp=12V in the case of a PC Card slot. During operation of the integrated circuit card at lower power levels, the primary voltage source is able to supply substantially all of the required power, such that the switch of the switching regulator may remain predominantly open, minimizing switching noise. During operation of the integrated circuit card at higher power levels, the switching regulator boosts the output voltage just enough to compensate for voltage droop. The integrated circuit card is therefore supplied with a stable, low-noise source of power.

3 Claims, 1 Drawing Sheet

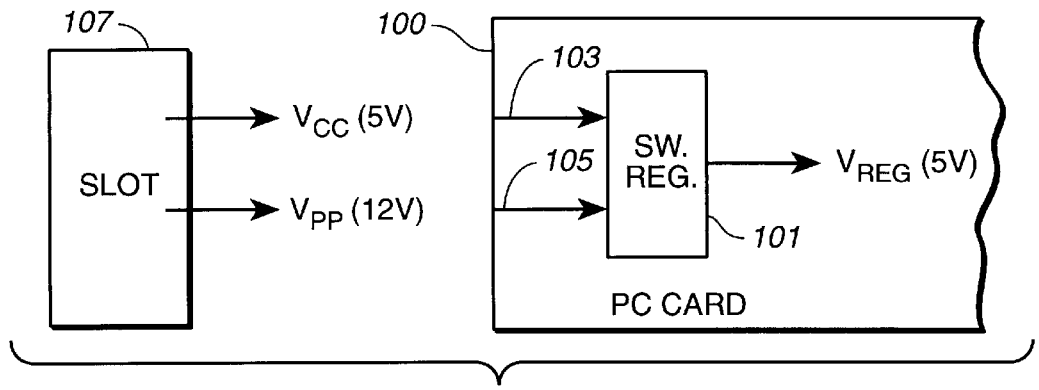
FIG. 1
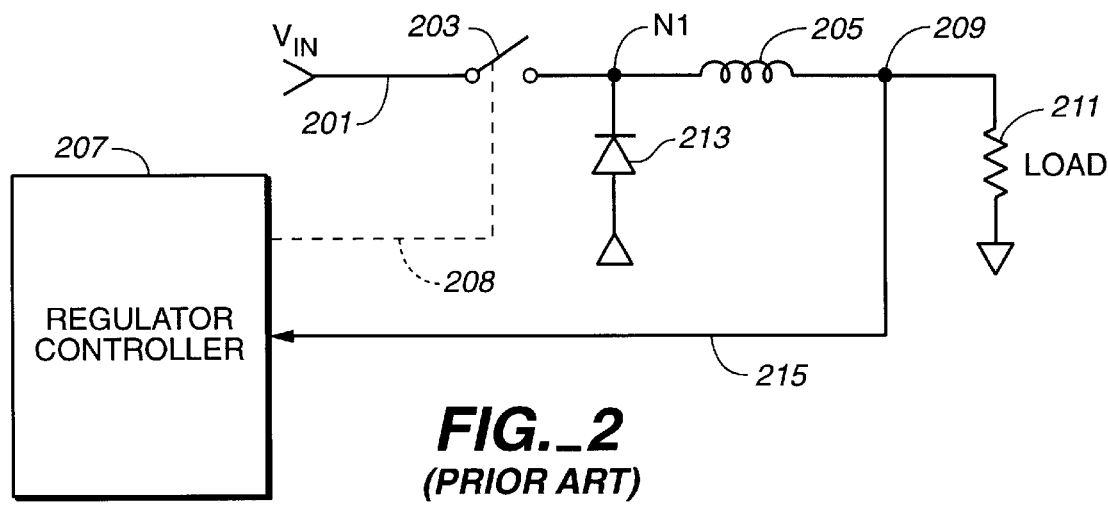
FIG._2
*(PRIOR ART)*
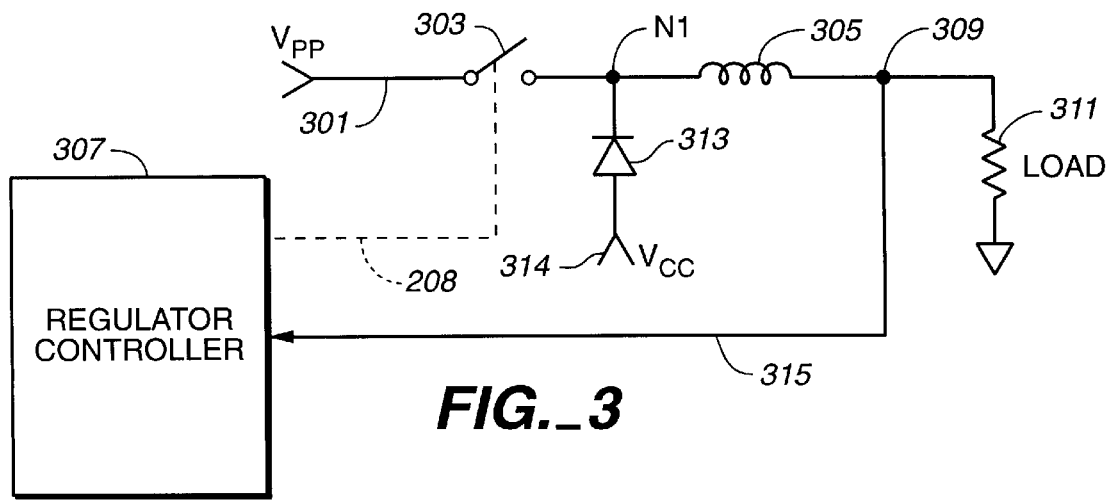
FIG._3

CURRENT BOOSTER FOR PC CARD

1. Field of the Invention

The present invention relates to step-down converters, particular step-down converters for use within PCMCIA cards, otherwise known as PC Cards™.

2. State of the Art

Integrated circuit cards, particularly cards conforming to the PCMCIA or PC Card™ standard, have become a mainstay of mobile computing. Devices of various descriptions are available in the PCMCIA format, including memory cards, modems, disk drives, etc. Because of the origins of the standard as a memory card standard, however, a PC Card slot on a laptop computer has a power supply best suited to the power requirements of memory cards and similar devices. In particular, a PC Card provides a programming voltage, Vpp, and a logic voltage Vcc. The Vpp output on the slot will typically source 12–50 mA at 12V, while the Vcc output will typically source 600 mA at 5V. On some computers, however, at currents above 0.5 A, however, voltage droop often occurs.

The foregoing voltage droop phenomenon is troublesome for PC Card wireless modems and can be troublesome for other types of PC Cards. Such modems require a stable power supply in order to function reliably. However, such modems also routinely exceed the threshold of 0.5 A current draw at which the typical PC Card power supply begins to experience voltage droop.

What is needed, then, is an improved power supply arrangement suitable for PC Card wireless modems and a variety of other devices that present a relatively high current load.

SUMMARY OF THE INVENTION

The present invention, generally speaking, provides for an integrated circuit card, such as PC Card, in which a step-down converter in the form of a switching regulator provides a stable operating voltage at increased current. In particular, a quiet and stable power supply is obtained by modifying the standard configuration of a switching regulator such that the catch diode, or free-wheeling diode, instead of being connected to ground at the non-blocking terminal, is connected to a primary voltage source approximating the desired output voltage. If the desired output voltage is 5V, for example, the catch diode may be connected to Vcc supplied by a PC Card slot, which nominally supplies 5V. The block terminal of the catch diode is connected through the switch of the switching regulator to a higher, supplementary, voltage source, e.g. Vpp=12V in the case of a PC Card slot. During operation of the integrated circuit card at lower power levels, the primary voltage source is able to supply substantially all of the required power. The primary voltage source is used primarily, because it provides the highest available power output (e.g., 5V@1 A=5 W, versus 12V@50 mA=0.6 W). During operation of the integrated circuit card at higher power levels, the switching regulator boosts the output voltage just enough to compensate for voltage droop. The integrated circuit card is therefore supplied with a stable 5V source of power, even at currents exceeding that normally available on the 5V supply. This method can also be used in non-PCMCIA applications.

BRIEF DESCRIPTION OF THE DRAWING

The present invention may be further understood from the following description in conjunction with the appended drawing. In the drawing:

FIG. 1 is a block diagram of an integrated circuit card of the present invention, shown in relation to a slot that receives and supplies power to the card;

FIG. 2 is a schematic block diagram of a conventional step-down converter; and

FIG. 3 is a schematic block diagram of a conventional step-down converter in accordance with the present invention.

DETAILED DESCRIPTION OF THE PREFERRED EMBODIMENT

Referring to FIG. 1, the present invention may be embodied in a PC Card 100, only a portion of which is shown. The PC Card 100 includes a switching regulator 101.

Switching regulators are well-known. Referring to FIG. 2, in a conventional switching regulator, an unregulated power supply input 201 is connected through an electronic switch 203 to an inductor 205. The electronic switch 203 is controlled by a controller 207 through a control line 208. When the electronic switch 203 is closed, a current flows through the inductor 205 and produces a voltage at the output terminal 209, to which is connected a load 211.

A catch diode 213 is connected from ground to a circuit node N1 joining the electronic switch 203 and the inductor 205. When the electronic switch 203 is open, current flows from ground, through the catch diode 213 and through the inductor 205 to the load.

A feedback signal line 215 is connected from the output terminal 209 to the controller 207. The controller 207 controls the electronic switch 203 so as to maintain the voltage at the output terminal 209 at a desired level.

Referring again to FIG. 1, unlike conventional switching regulators, which have power and ground inputs, the switching regulator 101 has two power supply inputs, a primary power supply input 103 and a supplementary power supply input 105. In a preferred embodiment, both the primary power supply input 103 and the supplementary power supply input 105 are supplied by a PC Card slot 107. The primary power supply input may be a logic-level voltage provided by the slot, e.g., 5V, and the supplementary power supply input may be a programming-level voltage provided by the slot, e.g., 12V.

The switching regulator 101 of FIG. 1 is shown in greater detail in FIG. 3. Notice that, as compared to the conventional switching regulator of FIG. 2, the catch diode 313 in FIG. 3, instead of being connected to ground, is connected to the primary power supply input Vcc, e.g., the 5V logic-level voltage supplied by the PC Card slot. At modest current levels, the primary power supply input is able by itself to supply the required current to the load and to maintain a stable voltage supply. The supplementary power supply input is not needed.

At higher current levels, the current-sourcing capability of the primary power supply input is exceeded and voltage droop begins to occur. Before voltage droop can occur to any significant degree, however, this condition is sensed by the controller 307, which closes the electronic switch 303 for so long as to raise the voltage at the output terminal 309 back to the desired level. When the voltage at the output terminal 309 begins to exceed the desired level, the controller 307 opens the electronic switch 303. Operation continues in this fashion, with the controller 307 alternately closing and opening the electronic switch 303, for so long as the increased current draw is maintained.

When the current draw falls back to a lower level, the primary power supply input is again able to maintain a stable voltage on the output terminal 309 without the help of the supplementary power supply input. The switch 303 therefore remains open.

In practice, a small drop in voltage occurs across the catch diode 313 such that, in order to maintain at the output terminal 309 a stable voltage equal to the primary power supply input voltage, some assistance is required from the supplementary power supply input. In large part, however, the switch 303 remains open.

In the foregoing manner, the integrated circuit card is supplied with a stable, low-noise source of power.

It will be appreciated by those of ordinary skill in the art that the invention can be embodied in other specific forms without departing from the spirit or essential character thereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. An apparatus comprising:

a switching regulator comprising:

an electronic switch coupled at one terminal thereof to the supplementary power supply input and coupled at another terminal thereof to a circuit node;

a diode coupled at a blocking terminal thereof to the circuit node and coupled at a non-blocking terminal thereof to the primary power supply input; and an inductor coupled at a first terminal thereof to the circuit node and supplying a regulated output voltage at a second terminal thereof a primary power supply input to the switching regulator; and a supplementary power supply input to the switching regulator;

wherein the switching regulator produces a regulated power output having a voltage less than that of the supplementary power supply input and substantially equal to that of the primary power supply input, at an output current greater than a rated output current of the primary power supply.

2. The apparatus of claim 1, wherein the switching regulator further comprises:

a controller coupled to a control terminal of the electronic switch to control when the electronic switch opens and closes; and a feedback path coupled so as to feed the regulated output voltage back to the controller.

3. The apparatus of claim 2, wherein the primary power supply input is connected during operation to a logic-level voltage of not more than 5V, and the supplementary power supply input is connected during operation to a programming-level voltage of not less than 7V.

* * * * *